Jan. 22, 1963 R. C. BOUGHTON 3,074,747
COUPLING NUT ASSEMBLY
Filed Sept. 8, 1958
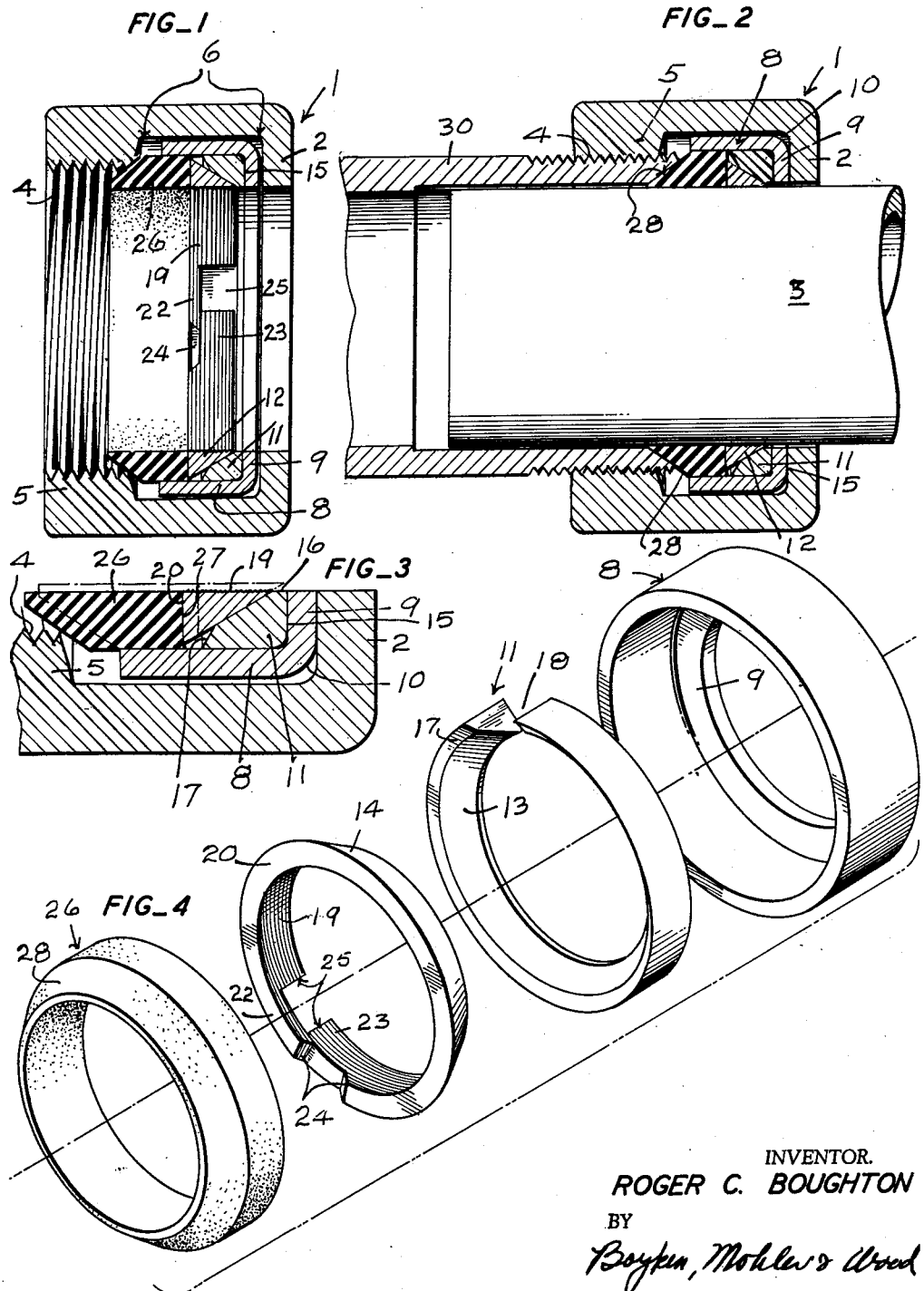
INVENTOR.
ROGER C. BOUGHTON
BY
Boyken, Mohler & Wood
ATTORNEYS United States Patent Office
3,074,747
Patented Jan. 22, 1963

3,074,747
COUPLING NUT ASSEMBLY
Roger C. Boughton, Alhambra, Calif., assignor to Joslyn
Mfg. & Supply Co., Chicago, Ill.
Filed Sept. 8, 1958, Ser. No. 759,713
1 Claim. (Cl. 285—342)

This invention relates to a coupling nut assembly or combination, for use in coupling a pipe having a smooth outer surface to a sleeve, elbow, T, and the like, the nut being threadedly secured to such sleeve, etc. Couplings of the type made with the assembly are known as "compression couplings," of the general type shown in my United States Patent No. 2,816,472, of December 17, 1957.

One of the objects of this invention is the provision of a nut assembly including a sealing gasket of rubber or rubber-like material that is adapted to form a seal against the pipe and sleeve and that also includes means for more rigidly and securely gripping the pipe that is being coupled than heretofore, and without injuring the gasket or any of the parts of the assembly.

It is essential in many instances that the pipe in a compression pipe coupling be rigidly secured to the sleeve so that the pipe will not loosen, or pull out of the sleeve for any reason, such as thrust due to internal pressure, expansion or contraction due to temperature changes or accidents, and other reasons.

Several of the objections to prior attempts to secure the sleeve to the pipe have been that in using the means employed for gripping the pipe, a sufficiently tight engagement has not been effected, or there has been relative rotation between wedge surfaces in cases where the nut itself has had a wedge surface adapted to engage a similar surface on a split ring, or the combination of the means for gripping the pipe and the gasket do not cooperate to produce the optimum desired result for each. There are other disadvantages to prior devices of the present kind, such as objectionable size, and cost of making and lack of durability under operating conditions, but many of these follow from the objections already noted.

One of the objects of the present invention is to produce a nut assembly that overcomes the above objections, and an added advantage is the production of a nut assembly, including the gasket, that will remain with the nut, as a unit, when the nut is separate from the pipe that is adapted to be sealed to the nut, and which nut assembly is operable for accomplishing the desired optimum results of effecting the desired seal and locking the pipe to the nut, under all conditions encountered.

Other objects and advantages will appear in the description and drawings.

In the drawings, FIG. 1 is an enlarged, cross sectional view taken through a nut assembly.

FIG. 2 is an enlarged sectional view similar to that of FIG. 1 showing the nut secured to the pipe that is connected by said nut to the sleeve or other fitting, such as an elbow, T, etc.

FIG. 3 is a greatly enlarged, fragmentary sectional view illustrating the movement of the locking means (in dot dash lines) under compression of the gasket, when the nut is screwed onto the fitting.

FIG. 4 is an exploded view of the elements that are adapted to be assembled with the nut, the latter not being shown.

In the description and claim, it is to be understood that the word "sleeve" is intended to include such structure as an elbow, T or any exteriorly end threaded fitting into which a pipe is adapted to extend and to which fitting the pipe is to be coupled.

In detail, the nut 1 illustrated herein is formed with a through cylindrical bore, at one end of which nut is a radially inwardly projecting flange 2 having an inner peripheral diameter slightly larger than the outside diameter of the pipe 3 that is adapted to be coupled with a sleeve.

At the end of the bore opposite to flange 2 the nut is formed with an internal thread 4, which thread is on a radially inwardly projecting part 5 of the nut and the portion 6 between flange 2 and said portion is unthreaded and of a greater and uniform inside diameter than that of flange 2 and part 5. Thus a radially inwardly opening channel is provided in nut 1 between its ends, the sides of which are formed by flange 2 and part 5, including thread 4 on said part 5, and the bottom of which is the wall of the nut between said flange 2 and part 5. It is within this channel that the sealing gasket and pipe gripping devices are held, together with a continuous, inexpandable bearing that, in turn is rotatable relative to nut 1 and that encloses the major portion of the sealing gasket and the pipe gripping means.

The bearing that encloses the major portion of the gasket and the pipe gripping means, comprises a cylindrical, continuous, inexpandable, cylindrical band 8 that is positioned within the nut in the unthreaded portion 6 and which band has been formed within said nut to have an inside diameter that is greater than the inside diameter of the part 5 at the root of the thread 4. This band is rotatable relative to the nut, and the length thereof may be slightly less than the distance between the flange 2 and part 5, as seen in FIG. 1.

At the end of band 8 that is adjacent to flange 2, the said band is formed with a radially inwardly extending flange 9, and the external surface of the band at its juncture 10 between the axially outwardly facing side of flange 9 is preferably rounded, so that any slight projections or roughness in the inside corner formed at the juncture between the bore of the nut and the flange 2 thereon will not prevent the axially outwardly facing surface of flange 9 from engaging the axially inwardly facing flat surface of the flange 2.

Positioned within the band 8 are a pair of transversely split wedge rings 11 and 12, which wedge rings have complementarily engaging frusto-concial wedge surfaces 13, 14 respectively formed thereon (FIG. 4), whereby one of the rings will be an outer ring and the other an inner ring, with the wedge surface on the outer ring facing generally radially inwardly and the wedge surface on the inner ring facing generally radially outwardly. The ring 11 in the assembly illustrated is the outer ring, and this ring has a flat axially facing surface 15 adapted to engage the flat axially facing inner surface of flange 9 on band 8.

The inwardly facing wedge surface 13 on ring 11 is at the side thereof opposite to surface 15 and extends angularly outwardly relatively to said last mentioned surface.

As best seen in FIG. 3, the ring 11 is formed with a cylindrical radially inwardly facing surface 16 that extends between the innermost edges of surfaces 13 and 15. This spaces the inclined wedge surface a sufficient distance from the flange 9 to prevent the wedge ring 12 from striking the flange while permitting adequate axial movement of the wedge ring 12 during its radial movement (as will later be explained) to engage the pipe 3 irrespective of variations in the diameter of the pipe.

The wedge surface 13 is at an angle of approximately 30 degrees relative to horizontal, or to the axis of the rings 11, 12 and, of course, the wedge surface 14 is at the same angle. Said wedge surface 13 terminates at its outer end at a point spaced from the cylindrical outer periphery of ring 11, and from the line where said surface 13 so terminates, a slightly steeper inclined surface 17 than that of the wedge surface 13 extends to the cylindrical outer surface of said ring. This surface 17 is inclined, however, in the same general direction as the wedge surface 13.

The wedge ring 11 is normally in expanded position, and therefore there is a gap 18 at the point where the ring is split. This enables contraction of the ring so that it may be inserted into the nut past the thread 4 and into the band 8, after which it will substantially fit inside said band, although not necessarily a snug fit. Preferably it will freely enter the band 8, after it is expanded, without resistance, but it would not fall out of the nut without contracting it.

The inner wedge ring 12, as pointed out before, has its wedge surface 14 complementary to surface 13, and the two surfaces will be in engagement, with the inside diameter of ring 12 substantially the same as that of ring 11 when both rings are in their normal expanded condition.

Ring 12 has a generally cylindrical inner surface that is formed with annular adjoining V-shaped grooves 19 thereby forming an axially extending row of annular teeth having their sharpened edges facing the axis of the ring. The surface 20 of ring 12 is preferably flat and perpendicular to the axis of the ring.

The end portions of the ring, at the split, are circumferentially extended at 22, 23, and said portions are in axially lapping relation with portion 22 being a full radial width extension of surface 20 as seen in FIG. 4, which extension is relatively thin axially of the ring.

The extension 23 is relatively thick axially of the ring 12 and carries the major portion of the wedge surface 14 with respect to the portion carried by extension 22.

The gaps 24, 25 respectively circumferentially beyond the outer ends of extensions 22, 23 are sufficient to enable the same degree of contraction as the gap 18 between the ends of ring 11.

The ring 12 is adapted to be enclosed within the cylindrical band 8, and an annular gasket 26 of rubber or rubber-like material that is radially distortable when placed under compression, has a flat axially facing surface 27 that is perpendicular to the axis of the gasket, and that is in engagement with the surface 20 of the wedge ring 12.

This gasket has an inside diameter that is substantially equal to the inside diameters of the wedge rings, and which diameter is preferably only slightly greater than the external diameter of pipe 3. Gasket 26 is relatively long axially, as compared with the similar dimension of rings 11, 12 and it has a cylindrical outer surface. The end portion of the gasket opposite to its end surface 27 has its outer surface inclined, in cross sectional contour, toward the axis of the ring from the outside of the ring in a direction away from the end 20, thereby providing a frusto-conical end wedge surface 28 having approximately a 30 degree angle relative horizontal. This inclined end surface may terminate slightly short of the inside of the ring providing a narrow annular end surface adjoining the inner surface of the ring at right angles to the latter.

In operation, the band 8, being die-expanded into the space 6, is in a position to receive the wedge rings 11, 12 which are contracted circumferentially a sufficient amount to pass thread 4, after which they will drop into the band 8 in a position with ring 11 against flange 9 of the band. The gasket 26 being readily distortable a sufficient degree to pass thread 4, is then placed in band 8, so that the major portion of the thick end of the gasket is enclosed in the band. When this is done, the assembly within the nut 1 cannot fall out of the nut, and the nut is ready for screwing onto the threaded end of a sleeve 30 (FIG. 2). This may be the threaded portion of any fitting adapted to be coupled to the pipe 3, which pipe usually has a plain end, instead of a threaded end.

The nut may be slipped onto the end of pipe 3 before inserting the pipe into the sleeve, or it may be lightly threaded onto the sleeve 30 (without compressing gasket 26) and thereafter the pipe 3 may be inserted. However, once the nut is on the sleeve and the pipe extends into the nut, it is merely necessary to tighten the nut onto the sleeve to effect both a sealing of the gasket with the pipe, sleeve and nut, and a locking of the nut onto the pipe. As the nut is tightened, there may be relative rotation between the flange 9 of the band and the flange 2 of the nut. This frictional resistance is relatively small, and while there may be relative rotation between the wedge rings 11, 12, the ring 12 that is in engagement with the gasket will remain stationary as ring 12 moves radially inwardly into progressively tighter engagement with pipe 3 upon tightening of nut 1. The depth of the gap 24 is only about 3/64 of an inch, and the gasket will readily enter this gap to bear against the extension 23 and in the event the ring 12 is circumferentially contracted a sufficient degree so that gasket 26 engages the inclined surface 17 on ring 11, the latter will urge the gasket radially inwardly and toward pipe 3, instead of merely exerting an axial pressure on the gasket.

The ring 12 is preferably of steel or material that is harder than the material of pipe 3, which may be of say 90 to 130 Brinell hardness, so that the teeth on the inner surface of ring 12 will enter the pipe. The ring 11 may be of spring brass, where ring 12 is of steel, thus providing a lower coefficient of friction to prevent galling, and the wedge surfaces are preferably polished to eliminate the need for any lubricant.

In the above arrangement, it is seen that once the teeth 19 on the ring 12 enter the metal of the pipe, the pipe will not slip in the nut or relative to the sleeve, and the greater the force tending to pull the pipe out of the sleeve, the greater will be the gripping action of wedge ring 12, and there will be no rotation of the ring 12.

It should be noted that the present design affords a compactness combined with adequate width in the gasket, to insure a proper seal. The provision of the steeper end surface 17 on the ring 11 substantially reduces the width of the ring, thereby permitting a wider gasket in direction axially of the nut, than were the surface 13 to extend to the outer periphery of the ring. The radial dimension of ring 12 at any side is sufficient to allow for variations in the pipe 3, and it is also sufficient to provide an axially facing surface 20 that is adequate for acting upon by the gasket.

It may be here noted that the angle of 30 degrees relative to horizontal for wedge surfaces is preferable. If this were substantially greater, such as 45 degrees, for example, the rings would not accomplish the desired result, and if the angle were substantially less than 30 degrees relative to horizontal, say 20 degrees, the vertical surface 20 would be insufficient for the necessary action from the gasket.

I claim:

A coupling nut for use on the externally threaded end of a sleeve and the like of a pipe coupling for effecting a seal between the cylindrical outer surface of an inner pipe adapted to extend into said sleeve and said nut, said nut having a central through bore adapted to pass such inner pipe therethrough, said bore having a thread formed therein at one end thereof and a radially inwardly projecting flange at the opposite end thereof and an unthreaded portion between said flange and said thread, a continuous cylindrical metal band rotatable in said unthreaded portion having an inwardly extending flange at one end thereof adapted to slidably engage the inner surface of said radially inwardly projecting flange on said nut and having an open end opposite to said inwardly projecting flange, a pair of coaxial wedge rings having complementarily formed engaging frustro-conical wedge surfaces providing an inner ring having one of said wedge surfaces thereon directed generally radially outwardly and an outer ring having the other of said wedge surfaces thereon directed generally radially inwardly, said pair of wedge rings being positioned within said cylindrical band in a position in which said outer ring is in engagement with the axially facing inner surface of said inwardly extending flange on said band with the wedge surface of said outer ring extending toward the threaded end of said nut, an annular gasket of elastic material that is radially distortable under axial compression extending into said band at the end thereof opposite to said inwardly extending flange thereon and into engagement with the axially facing surface of said inner wedge ring, said gasket projecting axially outwardly of said open end of said band for engagement with such sleeve when the latter is screwed into the threaded end of said nut, said inner ring being transversely split and circumferentially expanded for contraction upon said gasket being axially urged axially thereof toward said radially inwardly projecting flange on said nut and against said inner wedge ring whereby the radially inwardly directed surface of said inner ring would be adapted to tightly engage the outer surface of such inner pipe, said outer ring having a marginal, axially facing surface extending radially outwardly of the larger diameter end of the frusto-conical wedge surface thereon, said marginal axially facing surface being inclined in cross sectional contour in the same general direction as said last mentioned frusto-conical wedge surface but to a lesser degree relative to vertical, and said last mentioned surface extending radially outwardly of said inner ring for engagement with said gasket upon said gasket being compressed axially thereof to a sufficient degree.

References Cited in the file of this patent

UNITED STATES PATENTS

| | | |
|---|---|---|
| 974,804 | McCabe | Nov. 8, 1910 |
| 1,716,519 | Farmer | June 11, 1929 |
| 2,349,180 | Lamont | May 16, 1944 |
| 2,452,276 | Woodling | Oct. 26, 1948 |
| 2,756,017 | Silverman | July 24, 1956 |
| 2,772,100 | Kreissig | Nov. 27, 1956 |
| 2,816,472 | Boughton | Dec. 17, 1957 |

FOREIGN PATENTS

| | | |
|---|---|---|
| 292,695 | Italy | June 28, 1932 |
| 492,959 | Great Britain | Jan. 29, 1938 |
| 59,457 | Denmark | Jan. 19, 1942 |